United States Patent
Grimes et al.

(10) Patent No.: US 6,393,921 B1
(45) Date of Patent: May 28, 2002

(54) MAGNETOELASTIC SENSING APPARATUS AND METHOD FOR REMOTE PRESSURE QUERY OF AN ENVIRONMENT

(75) Inventors: Craig A. Grimes, Lexington, KY (US); Plamen G. Stoyanov, Worcester, MA (US); Dimitris Kouzoudis, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/502,663

(22) Filed: Feb. 11, 2000

Related U.S. Application Data
(60) Provisional application No. 60/133,979, filed on May 13, 1999.

(51) Int. Cl.[7] .............................................. G01L 9/10
(52) U.S. Cl. .......................................... 73/728; 73/722
(58) Field of Search ............................. 73/828 SR, 722, 73/862.69, 862.48, 862.64, 862.046, 579, 643; 324/207.13, 207.15, 244, 247, 252, 260, 207.26; 333/148

(56) References Cited

U.S. PATENT DOCUMENTS

| | | | |
|---|---|---|---|
| 4,510,489 A | 4/1985 | Andrson, III et al. | 340/572 |
| 4,561,314 A | * 12/1985 | Alley et al. | 73/862.69 |
| 4,621,503 A | 11/1986 | Woods et al. | 62/228.3 |
| 4,660,025 A | 4/1987 | Humphrey | 340/572 |
| 4,745,401 A | 5/1988 | Montean | 340/572 |
| 4,769,631 A | 9/1988 | Copeland | 340/551 |
| 4,980,670 A | 12/1990 | Humphrey et al. | 340/551 |
| 5,053,112 A | 1/1992 | Piotrowski et al. | 340/572 |
| 5,130,697 A | 7/1992 | McGinn | 340/551 |
| 5,499,015 A | * 3/1996 | Winkler et al. | 340/551 |
| 5,514,337 A | 5/1996 | Groger et al. | 422/82.08 |

(List continued on next page.)

OTHER PUBLICATIONS

Barandiarán and Gutiérrez, 59 Sensors and Actuators A 38 (1997).

Barandiarán, et al., 5 Int. J. of Applied Electromagnetics in Materials 75 (1994).

*Primary Examiner*—Max Noori
*Assistant Examiner*—Abdullahi Aw-Musse
(74) *Attorney, Agent, or Firm*—Macheledt Bales LLP

(57) ABSTRACT

A pressure sensing apparatus for operative arrangement within an environment, having: a sensor comprising a hermetically-sealed receptacle, at least one side of which has an flexible membrane to which a magnetically hard element is attached. Enclosed within the receptacle is a magnetostrictive element that vibrates in response to a time-varying magnetic field. Also included is a receiver to measure a plurality of successive values for magneto-elastic emission intensity of the sensor taken over an operating range of successive interrogation frequencies to identify a resonant frequency value for the sensor. Additional features include: (a) the magnetically hard element may be adhered to an inner or outer side of, or embedded within, the membrane; (b) the magnetostrictive element can include one or more of a variety of different pre-formed, hardened regions; (c) the magneto-elastic emission may be a primarily acoustic or electromagnetic emission; and (d) in the event the time-varying magnetic field is emitted as a single pulse or series of pulses, the receiver unit can detect a transitory time-response of the emission intensity of each pulse (detected after a threshold amplitude value for the transitory time-response is observed). A Fourier transform of the time-response can yield results in the frequency domain. Also, an associated method of sensing pressure of an environment is included that uses a sensor having a magnetostrictive element to identify a magneto-elastic resonant frequency value therefore. Using the magneto-elastic resonant frequency value identified, a value for the pressure of the environment can be identified.

28 Claims, 8 Drawing Sheets

U.S. PATENT DOCUMENTS

| | | | |
|---|---|---|---|
| 5,538,803 A | 7/1996 | Gambino et al. | 428/694 TM |
| 5,552,778 A | 9/1996 | Schrott et al. | 340/825.34 |
| 5,554,974 A | 9/1996 | Brady et al. | 340/572 |
| 5,563,583 A | 10/1996 | Brady et al. | 340/572 |
| 5,565,847 A | 10/1996 | Gambino et al. | 340/572 |
| 5,585,772 A * | 12/1996 | Joshi et al. | 335/215 |
| 5,597,534 A | 1/1997 | Kaiser | 422/82.08 |
| 5,672,812 A | 9/1997 | Meyer | 373/35.07 |
| 5,747,986 A * | 5/1998 | Hristoforou | 324/207 |
| 5,754,110 A | 5/1998 | Appalucci et al. | 340/572 |
| 5,821,129 A | 10/1998 | Grimes et al. | 436/151 |
| 5,841,350 A | 11/1998 | Appalucci et al. | 340/572 |
| 5,859,587 A | 1/1999 | Alicot et al. | 340/572 |

\* cited by examiner

MAGNETOELASTIC SENSING APPARATUS AND METHOD FOR REMOTE PRESSURE QUERY OF AN ENVIRONMENT

This application claims priority to provisional patent application U.S. No. 60/133979 filed May 13, 1999.

This invention was developed with support from grant(s) made by the U.S Government No. NASA NAG5-4594 and by the National Science Foundation under contract ECS-9875104; therefore, the US Government has certain rights in this invention.

BACKGROUND OF THE INVENTION

In general, the present invention relates to telemetry using sensing elements remotely located from associated pick-up and processing units for the sensing and monitoring of pressure within an environment. More particularly, the invention relates to a unique remote pressure sensing apparatus that incorporates a magnetostrictive element (whether hermetically-sealed within a receptacle) and associated new method of sensing pressure of a fluid environment whether under vacuum or in a liquid, gas, or plasma state. Any of a number of applications is contemplated hereby, for example: biomedical applications (whether in vivo or in vitro) including medical test samples, food quality/inspection, monitoring of water (groundwater, treated water, or wastewater flowing in natural waterways, canals, or pipes), and monitoring manufacturing waste, etc. The new pressure sensing apparatus and method(s) provide information by utilizing, or listening for, the magneto-elastic emissions of one or more magnetostrictive elements (whether the element(s) also has a pre-formed region of 'local' hardening). The magneto-elastic listening frequencies of greatest interest are those at the magnetostrictive element's fundamental or harmonic resonant frequency. The pressure sensing apparatus of the invention can operate within a wide range of environments for remote one-time, random, periodic, or continuous/on-going monitoring of a particular fluid environment.

Pressure sensing can be performed according to the invention without requiring sophisticated equipment and the pressure sensor can be installed/positioned and removed with relative ease and without substantial disruption of the test environment. If need be, the sensor may be fabricated as a micro-circuit for use in vitro, in vivo, within small-sized sealed packaging or medical test samples (e.g., a test tube), and so on. As a micro-element, the invention can be used where space is limited and/or it is desired that the tiny sensor be positioned further into the interior of the sample or environment being tested/monitored. And, whether or not built on a larger scale, the novel pressure sensor can be used within buildings, an aircraft, or other open space. As it is well known, pressure, p, of a fluid (whether in liquid, gas, or plasma-form) is a function of the fluid's temperature: The instant invention further includes unique features that can sense and accommodate for environment temperature changes to give accurate pressure readings.

CO-PENDING U.S. PATENT APPLICATIONS ALSO FILED BY ASSIGNEE HEREOF

The assignee hereof filed pending patent applications (1) U.S. Ser. No. 09/223,689 on behalf of applicants common to the instant patent application, on Dec. 30, 1998 entitled "Remote Magneto-elastic Analyte, Viscosity and Temperature Sensing Apparatus and Associated Methods of Sensing"; and (2) U.S. Ser. No. 09/322,403 on behalf of an applicant common to the instant application, on May 28, 1999 entitled "Remote Resonant-Circuit Analyte Sensing Apparatus with Sensing Structure & Associated Method of Sensing". The invention disclosed in the instant patent application and the inventions disclosed in the pending patent applications U.S. Ser. Nos. 09/223,689 and 09/322,403 were invented by applicants who, at the time of invention, were employed by the assignee hereof.

GENERAL BACKGROUND OF MAGNETOSTRICTION

Simply defined, "magnetostriction" is the phenomena whereby a material will change shape (dimensions) in the presence of an external magnetic field. This effect is brought about by the reordering of the magnetic dipoles within the material. Since the atoms in a magnetostrictive material are not, for all practical purposes, perfectly spherical (they're shaped more like tiny ellipsoids) the reordering of the dipoles causes an elongation (or contraction depending on the mode of reorientation) of the lattice which leads to a macroscopic shape change in the material. There is a "reverse magnetostrictive effect", called the Villari effect: When an external stress is applied to a magnetostrictive material, a strain develops within the material which induces a surrounding magnetic field. Known magnetostrictive materials include alloys of iron (Fe), cobalt (Co), yttrium (Y), gadolinium (Gd), terbium (TB), dysprosium (Dy), and so on.

The so-called magnetoelastic effect is a phenomenon exhibited by ferromagnetic substances. It refers to the interdependence of the state of magnetization and the amount of mechanical strain present in the material and manifests as magnetostriction, volume change upon magnetization and, inversely, change in the state of magnetization upon application of stress. When a sample of magnetostrictive material is subjected to an applied small time-varying (AC) magnetic field superimposed on a much larger direct-current (DC) magnetic field, the magnetic energy is translated into elastic energy and the sample starts vibrating. The mechanical vibrations are most pronounced as the frequency of the applied AC field gets closer to the characteristic resonant frequency $f_0$ of the magnetostrictive sample and a voltage peak for emissions radiating from the sample can be registered by a pick-up coil in proximity thereto. This pronounced conversion from magnetic to elastic energy holds true at harmonics of resonant frequency $f_0$ This condition is known as magnetoelastic resonance. One example of magnetostriction is the "transformer hum" we hear when a transformer core "pulsates" upon the application of a 60 Hz magnetic field—the 'hum' is the emission of acoustic energy that generates sound.

It is well known that electric and magnetic fields are fundamentally fields of force that originate from electric charges. Whether a force field may be termed electric, magnetic, or electromagnetic (EM) hinges on the motional state of the electric charges relative to the point at which field observations are made. Electric charges at rest relative to an observation point give rise to an electrostatic (time-independent) field there. The relative motion of the charges provides an additional force field called magnetic. That added field is magnetostatic if the charges are moving at constant velocities relative to the observation point. Accelerated motions, on the other hand, produce both time-varying electric and magnetic fields, or electromagnetic fields. See *Engineering Electromagnetic Fields and Waves,* Carl T. A. Johnk, John Wiley & Sons, $2^{nd}$ Edition (1988). As stated, exposure of a time-varying (sinusoidal/AC) magnetic field will induce a time-varying current in a ferromagnetic sample such that it will emit EM energy. Also, this same piece of ferromagnetic material will emit acoustic and thermal energy due to the changes in size and viscous flexing of the material. An acoustic wave is an elastic, nonelectromagnetic wave with a frequency that may extend into the gigahertz (GHz) range. Acoustic transmission is that transfer of energy in the form of regular mechanical vibration through a medium (as a stress-wave emission). As defined, an ultrasonic wave is an acoustic emission having a frequency generally above 20 KHz (just above human hearing).

The commercially available 'anti-theft markers' (also called electronic article surveillance, or EAS, tags) operate by "listening" for acoustic energy emitted in response to an interrogating ac magnetic field, to sense the presence of an EAS marker. Sensormatic, Inc. distributes an EAS tag (dimensions 3.8 cm×1.25 cm×0.04 mm) designed to operate at a fixed frequency of 58 kHz (well beyond the audible range of human hearing). These EAS tags are embedded/incorporated into articles for retail sale. Upon exiting a store, a customer walks through a pair of field coils emitting a 58 kHz magnetic field. If an activated EAS tag is in an article being carried by the customer, the tag will likewise emit a 58 kHz electromagnetic signal that can be detected using a pickup coil, which in turn may set off an audible or visual alarm. More-recently, these tags are being placed in a box-resonator, sized slightly larger than the tag, such as the tags placed within a cavity 20 of a housing (FIG. 2, US patent Winkler et al.).

Although magnetostrictive ribbons made of magnetically soft amorphous metallic alloys (such as metallic glasses) have been used in a variety of applications such as anti-theft markers, strain sensors and position sensors, magnetostrictive elements have not been utilized as described herein (where the frequency response of the element is of particular significance) to measure pressure. Instead, known pressure sensing technologies generally require the operation of pressure gauges, most of which either operate on the principle of manometry (using a U-tube/differential manometer, or the simple manometer/piezometer which is impractical for measuring the pressure of gases) or utilize the flexing of an elastic diaphragm (the deflection of which is directly proportional to the applied pressure), or utilize the flexing of an arched tube of relatively small diameter such as is the Bourdon-tube gage does. For reference, the pressure in a vacuum (which, like 'outer space', is virtually void of gases) is called absolute zero, and all pressures referenced with respect to this zero pressure are termed "absolute pressures". Thus, atmospheric absolute pressure at sea level on a particular day might be measured at roughly 101 $kN/m^2$ (equivalent to 760 mm of deflection on a mercury barometer). Unlike conventional pressure measurement instruments, the instant invention needs no physical connections, such as wires or cables, to obtain a pressure measurement. No currently-available instrument or gage takes advantage of the magneto-elastic emission properties of magnetostrictive materials to obtain a pressure measurement.

Therefore, a versatile sensor apparatus and method are needed for making pressure measurements within a variety of diverse environments through remote query, without direct electrical hard-wire connection and without the need to specifically orient the sensor element in order to make such measurements. Without reasonable, cost-effective solutions at hand for reliably monitoring pressure environments that are difficult to access, in a timely manner, one cannot obtain important, accurate pressure data; and under certain circumstances it is imperative that reliable comprehensive data be available to scientists, health care professionals, process and quality engineers, environmental agencies, etc.

SUMMARY OF THE INVENTION

It is a primary object of this invention to provide a pressure sensing apparatus for operative arrangement within an environment that incorporates a sensor with at least one magnetostrictive element (whether the element(s) has one or more pre-formed regions of 'local' hardening) that will vibrate in response to a time-varying magnetic field (whether radiated continuously over an interval of time or transmitted as a pulse). The magnetostrictive element may be enclosed within a hermetically-sealed receptacle, at least one side of the receptacle having a flexible membrane to which a magnetically hard element is attached. The pressure sensing apparatus also includes a receiver unit capable of picking up emissions (whether EM or acoustic) from the sensor. Preferably, the receiver (a) measures a plurality of successive values for magneto-elastic emission intensity of the sensor taken over an operating range of successive interrogation frequencies to identify a resonant frequency value for the sensor, or (b) detects a transitory time-response of magneto-elastic emission intensity of the sensor due to a time-varying magnetic field pulse to identify a magneto-elastic resonant frequency value thereof. In the latter case, the detection can be done after a threshold amplitude value for the transitory time-response of magneto-elastic emission intensity has been observed; then a Fourier transform can be performed on the transitory time-response of the emission to convert the detected time-response information into the frequency domain.

It is also an object of this invention to provide a method of sensing pressure of an environment using a sensor having at least one magnetostrictive element (whether the element (s) has one or more pre-formed regions of 'local' hardening and is enclosed within a hermetically-sealed receptacle). The method comprises the steps of: operatively arranging the element in the environment in proximity to a DC bias field; applying a time-varying magnetic field or at least one magnetic field pulse (including a series of pulses); measuring a plurality of successive values for magneto-elastic emission intensity of the sensor with a receiver operating over a range of successive interrogation frequencies to identify a magneto-elastic resonant frequency value of the sensor; and using said magneto-elastic resonant frequency value, identify a value for the pressure of the environment. In the event a time-varying magnetic field pulse, or series of pulses, are applied, the method can also include the step of detecting a transitory time-response of magneto-elastic emission intensity of the sensor with a receiver to identify a magneto-elastic resonant frequency value of the sensor to be used for identifying the pressure of the environment. And, to convert the detected time-response information into a frequency domain format, one can perform a Fourier transform on the transitory time-response of magneto-elastic emission intensity detected.

As one can readily appreciate, within the spirit and broad scope of design goals contemplated herein, the innovative pressure sensing apparatus and associated method can be fabricated from micro-components or built on a much larger scale and formed into many different shapes using a variety of suitable materials; and several sensing elements can be incorporated into an array to provide a package of sensing information to accommodate environments at different temperatures. Preferably, each of these additional elements respond to temperature fluctuations at a different rate. One can cross-correlate the responses of the different temperature elements to determine an absolute temperature of the environment which can be used to correct any pressure measurements taken. Furthermore, the simple, yet effective design allows the pressure sensing apparatus and method of the invention to be incorporated into a system that utilizes available computer processors, data acquisition equipment, and memory in the event complex pressure data acquisition and data processing is desired.

The advantages of providing the flexible new pressure sensing apparatus of the invention, and associated new method of sensing pressure of an environment using a sensor with at least one magnetostrictive element, follow:

(a) The invention can be used for one-time (whether disposable), periodic, or random operation, or used for continuous on-going monitoring of pressure changes in a wide variety of environments;

(b) Versatility—The invention can be used for operation within a wide range of testing environments such as biomedical applications (whether in vivo or in vitro), within medical test samples, food quality/inspection (within or outside of sealed packing), monitoring of contaminants in water (groundwater, treated water, or wastewater flowing in natural waterways, canals, or pipes), monitoring of gas manufacturing waste, etc.;

(c) Simplicity of use—The new sensor structure can be installed/positioned and removed with relative ease and without substantial disruption of a test sample or environment;

(d) Structural design flexibility—the sensor may be formed into many different shapes and may be fabricated as a micro-circuit for use where space is limited and/or the tiny sensor must be positioned further into the interior of a sample or environment being tested/monitored;

(e) Several sensors may be positioned, each at a different location within a large test environment, to monitor pressure of the different locations, simultaneously or sequentially;

(f) Several sensor elements may be incorporated into an array to provide a package of sensing information about an environment, including pressure and temperature changes;

(g) Receiving unit design flexibility—One unit may be built with the capacity to receive acoustic emissions (elastic nonelectromagnetic waves that can have a frequency up into the gigahertz, GHz, range) as well as electromagnetic emissions emanating from the sensor, or separate acoustic wave and electromagnetic wave receiving units may be used;

(h) Apparatus design simplicity and associated cost reduction—Reducing the number and size of components required to build a pressure sensing apparatus can reduce overall fabrication costs and add to ease of operation; and (i) Sensor materials and size can be chosen to make one-time, disposable use economically feasible.

Briefly described, once again, the invention includes a pressure sensing apparatus for operative arrangement within an environment, having: a sensor comprising a hermetically-sealed receptacle, at least one side of which has an flexible membrane to which a magnetically hard element is attached/interconnected. Enclosed within the receptacle is a magnetostrictive element to vibrate in response to a time-varying magnetic field. The apparatus also includes a receiver to measure a plurality of successive values for magneto-elastic emission intensity of the sensor taken over an operating range of successive interrogation frequencies to identify a resonant frequency value for said sensor. Additional further distinguishing features include: (a) the magnetically hard element may be adhered to an inner or outer side of, or embedded within as part of, the membrane; (b) the magnetostrictive element can include one or more of a variety of different pre-formed, hardened regions; (c) the magneto-elastic emission may be a primarily acoustic, if the environment pressure is not under vacuum, or primarily an electromagnetic emission—the receiver being capable of detecting the primary type emitted; and (d) in the event the time-varying magnetic field is emitted as a single pulse or series of pulses, the receiver unit will detect a transitory time-response of the emission intensity of each pulse (detected after a threshold amplitude value for the transitory time-response is observed) and then convert the time-response information into the frequency domain via Fourier transform.

Further, an elongated magnetostrictive element with at least one pre-formed region need not be enclosed within the hermetically-sealed receptacle if positioned such that it is operational within a DC bias field, which may be generated by a variety of sources. The magnetostrictive element can be ribbon-shaped, a planar-square, plate-shape, and so on, and may be made of an alloy of an element selected from the group consisting of iron, cobalt, nickel, yttrium, gadolinium, terbium, dysprosium, and related metals. The pre-formed region may be made using any of a number of material hardening techniques such as: twisting, creasing, bending/folding, embossing, drawing, punching, hammering, and so on. A pre-correlation made between a series of magneto-elastic resonant frequency values taken for the sensor and a corresponding series of pressure values can be used for the identification of a value for pressure of the environment. A computerized processor can be used for such identification as well as for data acquisition. Additional magnetostrictive elements can be included with the sensing apparatus in an array for use to respond to temperature of the environment. Each element is preferably structured such that it has its own distinct operating range, allowing the receiver to distinguish emissions received from each separate element so that separate types of sensing information can be obtained, tracked and computed. Furthermore, a designated additional magnetizable magnetically hard element which can be activated to support an external stray magnetic field, may be positioned in proximity to the sensing apparatus to act as an ON-OFF switch for the sensor.

Also characterized is a method of sensing pressure of a environment using a sensor with a magnetostrictive element comprising the steps of: providing the magnetostrictive element with a pre-formed region and operatively arranging the element in the environment in proximity to a DC bias field; applying a time-varying magnetic field; measuring a plurality of successive values for magneto-elastic emission intensity of the sensor with a receiver operating over a range of successive interrogation frequencies to identify a magneto-elastic resonant frequency value for the sensor; and using the magneto-elastic resonant frequency value, identify a value for the pressure of the environment.

In addition to the unique features identified above in connection with the apparatus of the invention further distinguishing steps, include: enclosing the magnetostrictive element within a hermetically-sealed receptacle, at least one side of which has an flexible membrane to which a magnetically hard element is attached/interconnected, and operatively arranging the element in the environment; detecting a transitory time-response of magneto-elastic emission intensity of the sensor with a receiver to identify a magneto-elastic resonant frequency value for the sensor (which may be performed after a threshold amplitude value for the time-response of emission is observed); and performing a Fourier transform on the transitory time-response to convert it into the frequency domain.

BRIEF DESCRIPTION OF THE DRAWINGS

For purposes of illustrating the flexibility of design and versatility of the innovative preferred pressure sensing apparatus and method, the invention will be more particularly described by referencing the accompanying drawings of embodiments of the invention (in which like numerals designate like parts). The figures have been included to communicate the features of the invention by way of example, only, and are in no way intended to unduly limit the disclosure hereof.

DETAILED DESCRIPTION OF THE PREFERRED AND ALTERNATIVE EMBODIMENTS

Figure 1:
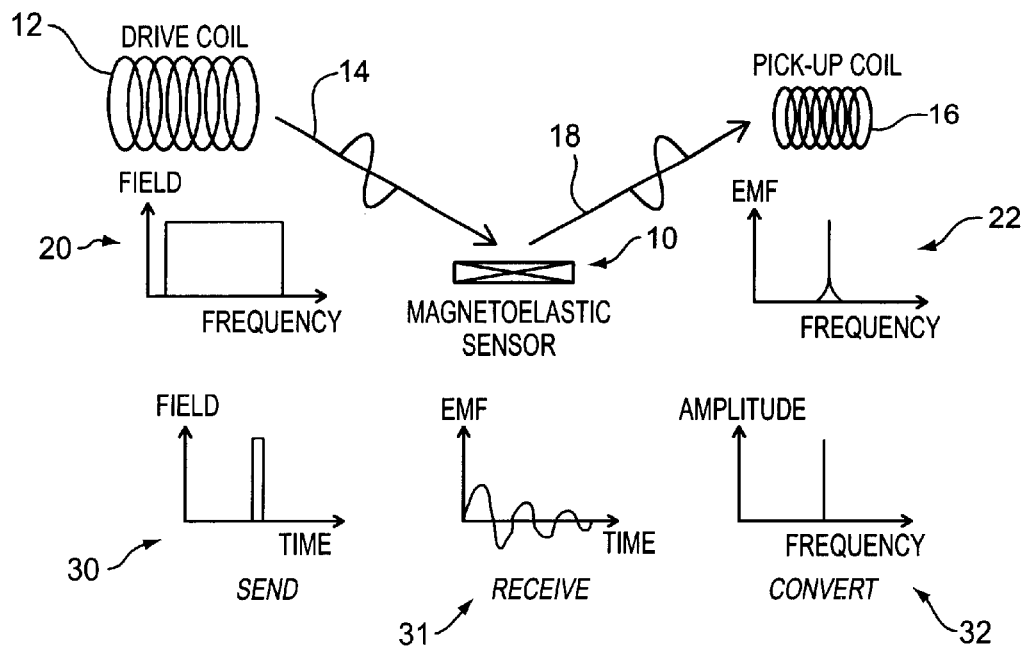
FIG. 1 is a schematic and corresponding simple graphical representations depicting the general operational principle of the magneto-elastic sensor of the invention: an AC magnetic wave is emitted (whether continuous over a period or emitted from the drive coil as a pulse) causing the element to respond with its own emission picked up by a receiver.

FIG. 1 schematically illustrates a sensor 10 having at least one magnetostrictive element, positioned such that a time-varying electromagnetic (EM) field 14 produced by a drive coil 12 can cause sensor 10 to emit energy 18, here, shown as an EM wave. Shown graphically at 20, an AC magnetic wave generated to sweep over a range of frequencies will cause sensor 10 to emit with a peak at its characteristic frequency (shown graphically at 22). Likewise, as shown graphically in the time-domain at 30, an AC magnetic field pulse causes sensor 10 to emit waves (shown, here, as the transitory time-response curve 31) which can readily be converted into the frequency domain by finding the Fourier transform of the time-response curve. Once performed, the result is as graphed 32 with a spike at the characteristic resonant frequency of sensor 10. For such a case, by way of example, the pulse can be emitted, detected, and converted to the frequency domain for comparison with a pre-correlation for this particular sensor 10 to determine pressure of the environment, all in a matter of tens-of-milliseconds (e.g., 50 msec.). Note that drive coil 12 and pick-up coil 16 may be housed within a single unit as desired.

Figure 2:
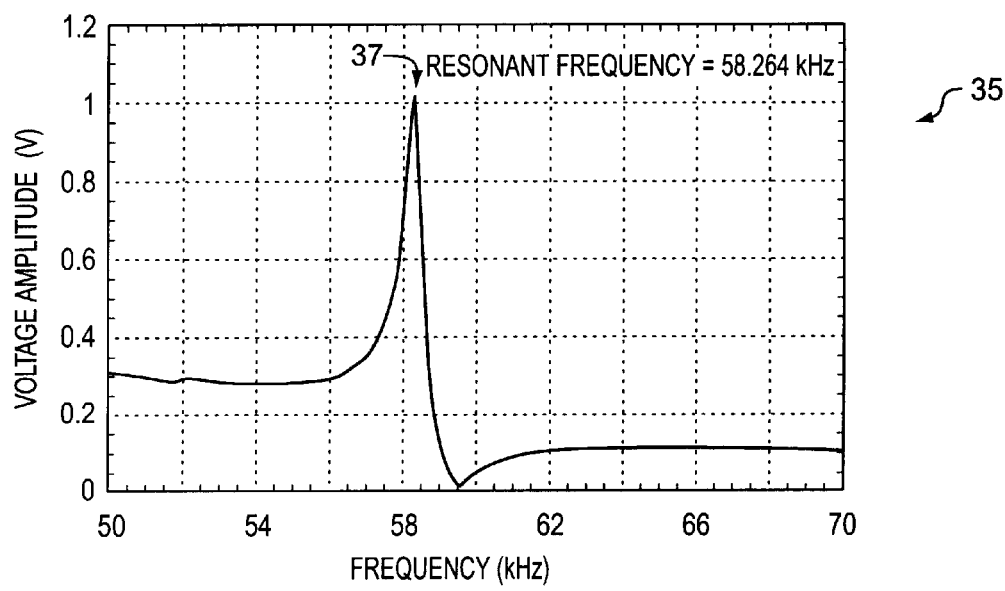
FIG. 2 is a graphical representation of the frequency spectrum of a tiny magnetostrictive element, sized 5 mm×40 mm×30 $\mu$m made of METGLAS™ 2826MB, composition $Fe_{40}Ni_{38}Mo_4B_{18}$, measured in air at room temperature. A voltage peak due to emissions from the sensor would also be observed for harmonics of the resonant frequency.

FIG. 2 is a graphical representation 35 of the frequency spectrum of a tiny magnetostrictive element measured in air at room temperature, by way of example only, the spectrum was taken for an element sized 5 mm×40 mm×30 $\mu$m made of METGLAS™ 2826MB, a magnetically soft metallic glass (distributed by the Allied Signal Corporation) having a composition $Fe_{40}Ni_{38}Mo_4B_{18}$. A voltage peak has been labeled 37: This peak occurs at the characteristic resonant frequency for this element, or $f_0$=58.264 kHz and represents the point at which the strongest, most-efficient emission radiate from the sensor. Peaks would also be observed at harmonic frequencies of the element's resonant frequency.

Figure 3A:
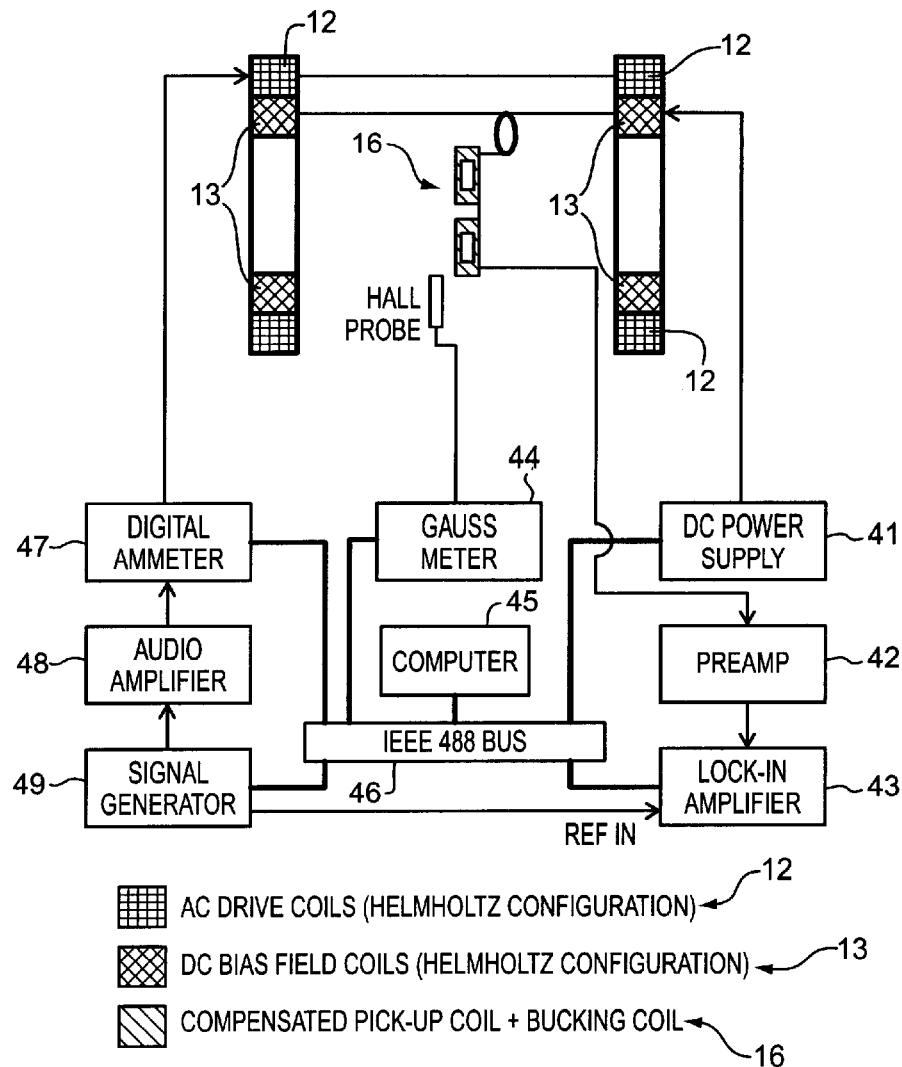
FIG. 3A is a schematic depicting equipment for carrying out the calibration of a magnetostrictive element to determine a pre-correlation of its response, as well as carrying out the operation of the apparatus and method of the invention to measure pressure of an environment.

The schematic representation labeled FIG. 3A depicts equipment that can be used to carry out a calibration of a magnetostrictive element, sensor package, or array of elements to establish a pre-correlation of frequency response to pressure or temperature readings. This equipment can also be used for carrying out the operation of the apparatus and method of the invention to measure pressure of an environment. Pick-up coil 16 is located in proximity to the sensor (not detailed for simplicity) and between the windings of AC drive coil(s) 12 and DC bias coil(s) 13 (powered by DC supply 41). The drive coil 12 is fed by signal generator 49 through audio amp 48 and digital ammeter 47, all of which can communicate along a parallel IEEE 488 bus 46. In order to calibrate the response of the sensor to pressure changes, the sensing element is preferably housed within a pressure chamber—the pressure of which is externally controlled. For example in FIG. 3A, the sensor element could be placed inside a sealed TEFLON® tube connected to a high pressure cylinder of, say, nitrogen gas (not shown). As shown, the output of pick-up coil 16 is fed into preamplifier 42 and then through a lock-in amplifier 43. A gauss meter 44 has been included here to measure magnetic field/flux within the test environment for purposes of calibration. A computer processor (CPU) with memory, storage, etc. (at 45) not only controls the production of AC and DC fields, but also data acquisition and processing, as well as a suitable user interface to communicate readings.

Figure 3B:
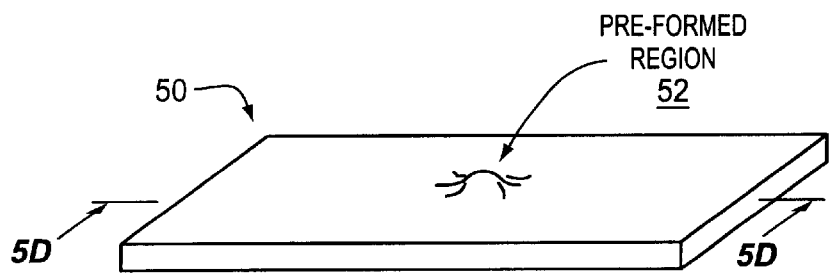
FIG. 3B illustrates a magnetostrictive element having a pre-formed region, by way of example shown here as a center-punch that does not extend through to create a hole.

Although the magnetostrictive element 50 shown in FIG. 3B is ribbon-shaped, many other suitable shapes will emit sufficiently to provide either the desired pressure or temperature readings, including rod/bars, planar-square shapes, circular/oval plate shapes, as well as generally planar element of various odd-shaped peripheries. A pre-formed region 52, illustrated here as an embossed or center-punched dimple, has been formed into element 50; one or more pre-formed regions can be made into sensor elements using any of a number of material work hardening techniques such as: twisting, creasing, bending/folding, embossing, drawing, punching, hammering, and so on. The term work hardening as used in connection with materials in solid-form, implies a general increase in strength as well as hardness within the region that has been plastically deformed, with hardness being a measure of the resistance of a material to permanent deformed. Creating such a region in a magnetostrictive element has been found to heighten its responsiveness to a change in pressure or temperature, as the case may be; thus, the receiver (such as pick-up coil at 16 in FIG. 1) used to detect energy emitted from an element, in operation, to which a magnetic AC field has been applied need not be as sensitive yet can provide a suitably accurate reading of the environment.

Figure 4A:
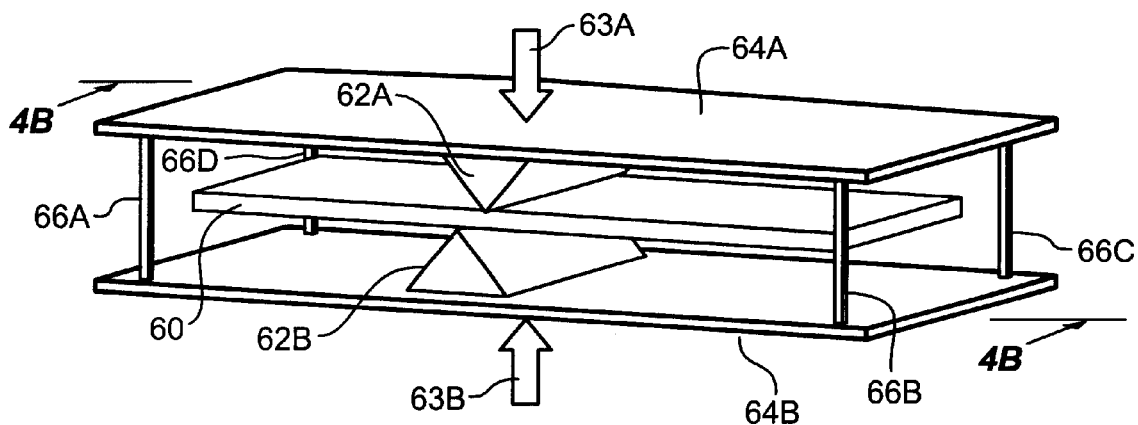
FIG. 4A is an isometric view outlining features of an alternate sensor shaped in the form of a magnetostrictive ribbon/strip which can be held between the offset 'teeth-like' 0 clamp of a support member. For example, it was found that at zero absolute pressure (vacuum) for this embodiment, the resonant frequency $f_0$ of a 37 mm×5 mm×30 $\mu$m METGLAS™ element is approximately 60 kHz; and as the pressure increases, $f_0$ decreases (see graphical representation labeled as FIG. 6).
Figure 4B:
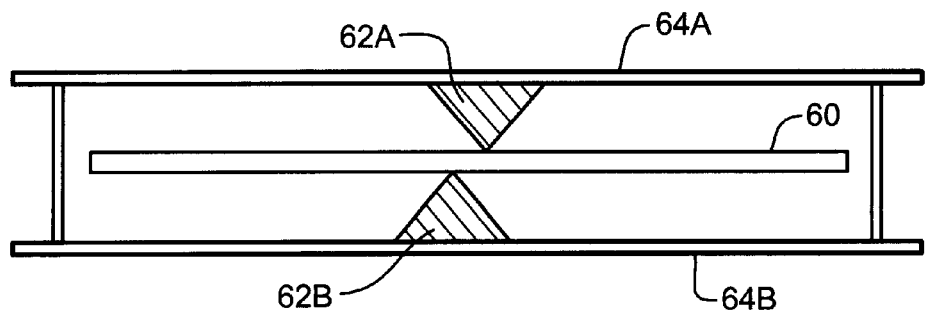
FIG. 4B is a sectional side view taken along 4B—4B of FIG. 4A showing the slightly offset clamp holding the ribbon/strip.
Figure 4C:
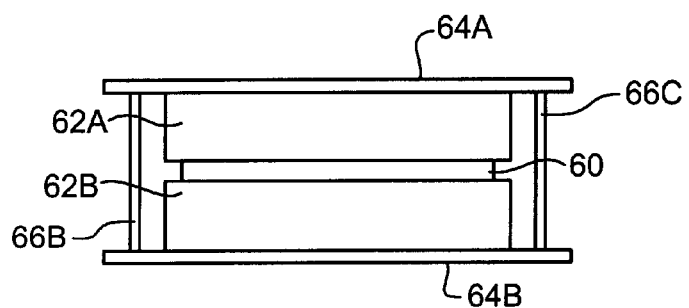
FIG. 4C is a planar end view of the alternate sensor of FIG. 4A.
Figure 4D:
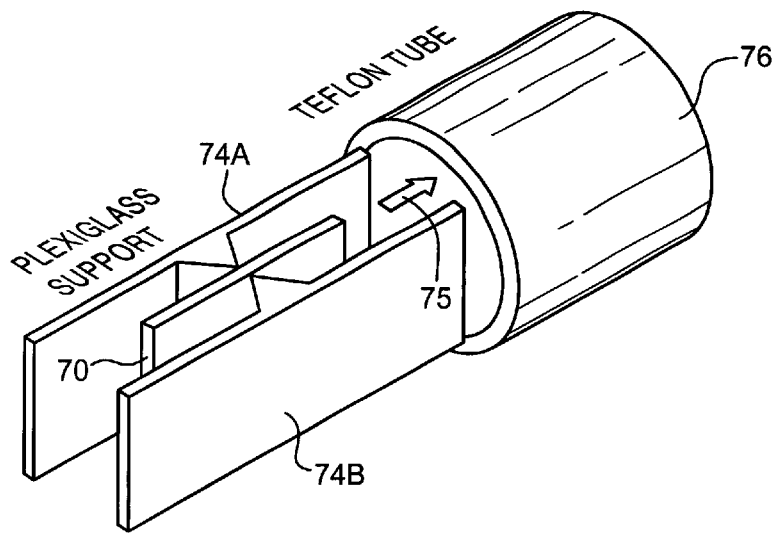
FIG. 4D illustrates a modification of the alternate sensor in FIG. 4A which can be inserted along the directional arrow, for a snug fit into a dielectric tube.

FIGS. 4A, 4B and 4C illustrate an alternative sensor design with a corrugated magnetostrictive element 60 that can be held between upper and lower pieces 64a, 64b of a support (made of a nonconductive material such as PLEXIGLAS so as not to emit its own EM waves in response to an applied magnetic AC field) by clamping support teeth 62a, 62b together in the direction of arrows 63a, 63b to form an assembly such as that shown in FIG. 4B as a cross-section taken along 4B—4B of FIG. 4A. The support pieces 64a, 64b can be spaced apart by suitable vertical supports 66a, 66b, 66c, 66d. A modification of the FIG. 4A embodiment is shown in FIG. 4D. Here, sensor element 70 is positioned between upper and lower pieces 74a, 74b having teeth-like protrusions to clamp the element 70 in positional relationship prior to being insertion along arrow 75 into dielectric tube support 76. Use of such a tubular, or other suitably shaped, support is required in the event it is necessary to keep the sensor element from lying, flat, on a surface of the environment being monitored (such as might happen if the sensor element falls to the bottom of a vat of liquid or within a mammalian stomach cavity) or in the event the element needs protection from breakage within a caustic environment. Although each ribbon element in FIGS. 4A–4D is shown as being supported generally at its fulcrum, the opposing clamp-protrusions are oriented slightly offset to cause a crease in the sensor element upon clamping; thus, creating a local work hardened region.

Figure 5A:
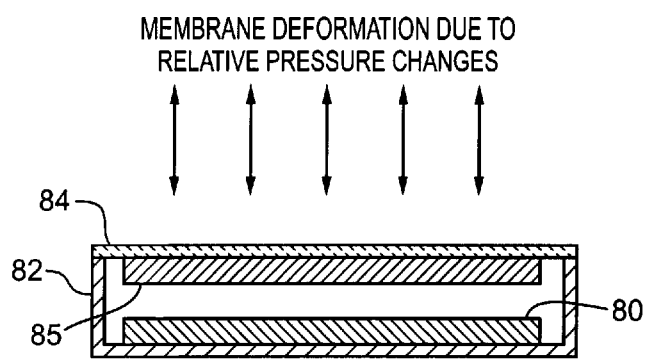
FIG. 5A is a sectional view of a preferred sensor of the invention having a magnetostrictive element encased within a sealed receptacle. For example, it was found that at zero absolute pressure (vacuum) for this embodiment, the resonant frequency $f_0$ of a 3 mm×20 mm×30 $\mu$m METGLAS™ element neared 58.38 kHz and as pressure was increased to a certain point, $f_0$ increased (see graphical representation labeled as FIG. 7).
Figure 5B:
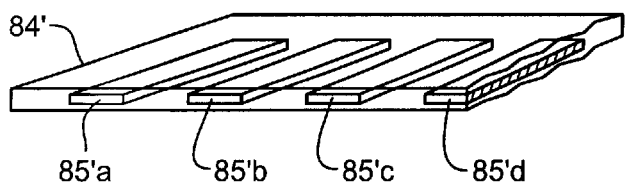
FIG. 5B shows an alternative flexible membrane, broken away, having DC bias elongated elements embedded therein.

The alternative preferred sensor pictured in FIG. 5A has a magnetostrictive element 80 positioned generally unencumbered within a receptacle made, here, of rectangular-box support 82 to which a flexible membrane 84 has been sealed, preferably in a fashion that does not allow surrounding fluid to enter the receptacle. Attached to the underside of membrane 84 is a DC bias element preferably made of a magnetically hard material (MHM) that can support a stray magnetic DC field, such as a thick film magnet. Attachment can be by suitable means such as adhesion, molding within, laminated between, partially or fully embedding within the membrane (an example of which is shown in FIG. 5B as alternative membrane 84' with embedded strips of MHM labeled 85a'–85d'), or other suitable means such that pressure changes of the environment exerted on flexible membrane 84 (also, 84') act to likewise deflect MHM element 85 causing a change in the relative spacing between MHM element 85 and magnetostrictive element 80. This, in turn, causes a change in the magnitude of the DC magnetic field to which the magnetostrictive element 80 is exposed. As the biasing DC magnetic field changes, so does the resonant frequency of the sensor as packaged. And it is this change in resonant frequency, as detected by measuring the emissions from the magnetostrictive sensor element 80 as packaged, that is of importance for making accurate pressure measurements. Thus, as set forth in further detail below, resonant frequency of the magnetostrictive element is a function of external pressure on the membrane 84. Once a sensor element (as packaged) has been calibrated and a pre-correlation found between frequency response of the sensor and respective pressure changes, this pre-correlation can be used to find (or monitor) an unknown pressure of an environment using the calibrated sensor package. The relative distance between sensor element 80 and MHM DC bias element 85 depends upon how magnetically hard the MHM bias element is (thus, dictating how strong its stray magnetic DC bias field will be once the MHM is activated). If using a very strong magnetic material like samarium-cobalt that can produce a stronger DC bias field, this distance is on the order of a few centimeters; whereas the weaker MHM elements need to be a few millimeters (in the example shown in FIG. 5A, roughly 2 mm) from the magnetostrictive sensor element to cause the desired effect.

The characteristic frequencies of longitudinal vibrations in the basal plane of a thin ribbonlike strip of length L can be calculated using the following expression:

$$f_n = \sqrt{\frac{E}{\rho(1-\sigma^2)}} \frac{n\pi}{L} \quad n = 1, 2, 3, \ldots \quad (1)$$

where E is Young's modulus of elasticity, σ is the Poisson ratio of the plate/ribbon material, ρ is the density of the sample, L is the length of the ribbon, with n denoting integers. For this analysis, the focus is on the fundamental resonant frequency, or n=1, due to its relatively larger amplitude; although harmonics of the fundamental resonant frequency apply as well. Thus, one can see that for a given material the resonant frequency can be tuned to any particular value by trimming the length of the plate/ribbon. Also, resonant frequency is sensitive to changes in ambient temperature, pressure and state of magnetization (ΔE effect) generally as a result of the dependence of Young's elastic modulus on these factors. Note also that the characteristic resonant frequency also depends upon the magnitude of the DC biasing field and any direct mass load acting on the surface of the plate/ribbon element.

If the resonator element surface has a localized mass applied, the resonant frequency can change significantly. If the resonator is shaped as a bar with ends free to vibrate (see for example, the embodiments in FIGS. 4A–4D), the set of the longitudinal resonant frequencies $f_n$ is given by the expression:

$$f_n = \sqrt{\frac{E}{\rho}} \frac{n}{2L}, n = 1, 2, 3, \ldots \quad (2)$$

A bar/ribbon directly 'loaded' with a point mass at one of the ends (at x=L), the new set of resonance frequencies can be found using the following equation:

$$\tan kL = -\frac{2\pi fm}{S\sqrt{E\rho}}, \quad (3)$$

where S is the cross-sectional area of the bar and k is a wavenumber. Although this transcendental equation has no explicit solution, it can be solved numerically. For a very light magnetostrictive bar/ribbon (with a mass on the order of several milligrams) such as can be used in connection with the apparatus and method of the invention, a very small mass load directly applied at one of the ends will be enough to convert a free-free bar into a fixed-free bar (thus reducing the resonant frequency by 100%). To transfer a deflection of membrane 84 due to an increase in external pressure into a localized load directly applied to the magnetostrictive element 80, one need only add a structural member (although not shown in FIG. 5A, this member would be oriented in a vertical direction) of a height sufficient to contact the element 80 after a specified membrane 84 deflection has occurred due to the increased external pressure. Once it is mathematically determined where, along an element, a localized direct load ought to be applied, the structural member can be readily positioned.

One can mathematically model the longitudinal oscillations of a thin elastic plate (for example, the sensor element 80 shown in FIG. 5A) in the presence of a dissipative force, namely the shear force acting on the basal plane of the sensor, at ambient atmospheric pressure. For a thin, homogenous elastic ribbon centered at the origin of a Cartesian coordinate system, oriented in the YZ plane with the y-axis oriented with the ribbon length and z the transversal direction, in the presence of external forces acting in the same plane the equations of equilibrium for longitudinal forces can be found by solving the following:

$$Ed\left[\frac{1}{1-\sigma^2}\frac{\partial^2 u_y}{\partial y^2} + \frac{1}{2(1+\sigma)}\frac{\partial^2 u_y}{\partial z^2} + \frac{1}{2(1-\sigma)}\frac{\partial^2 u_z}{\partial z \partial y}\right] + F_y = 0 \quad (4)$$

where d is the thickness of the sensor ribbon, $F_y$ is the external force per unit area of the ribbon's surface, and u denotes the displacement vector. The equations of motion for a ribbon-sensor in air can be obtained from Eq. (4) by replacing $F_y$ with $-\rho d(\partial^2 u_y/\partial t^2)$. For an incident (interrogating) plane wave propagating in the y-direction the displacement vectors are independent of z leaving the expression—and solution of Eq. (5) leads to Eq. (1):

$$\rho \frac{\partial^2 u_y}{\partial t^2} = \frac{E}{1-\sigma^2} \frac{\partial^2 u_y}{\partial y^2} \quad (5)$$

Next, if a mass $\Delta m$ which is much less than the mass of a ribbon-sensor M, is evenly deposited on the plate-like surface of the sensor Eq. (5) win become (A is the surface area):

$$\frac{M + \Delta m}{A} \frac{\partial^2 u_y}{\partial t^2} = \frac{E}{1-\sigma^2} \frac{\partial^2 u_y}{\partial y^2} \quad (6)$$

Although a sensor-element will exhibit magnetostrictive vibrations at almost any frequency of a driving AC magnetic field, these vibrations are most pronounced at the mechanical resonant frequency of the sensor, which is determined by sensor-element dimensions and its material properties. Therefore, it is necessary to seek a standing wave solution to Eq. (6) in the standard form:

$$u = 2Be^{-i\omega_n t}\cos\frac{n\pi y}{L} \quad (7)$$

where $\omega_n$ denotes the set of the longitudinal resonant frequencies of the sensor-element, including higher order harmonics, and B is a complex number. Substituting for u in Eq. (6) and taking the real part results in a the following expression that describes the resonant radian frequency of a mass loaded thin elastic plate sensor-element:

$$\omega_n^2 = \frac{1}{1+\frac{\Delta m}{M}} \frac{A}{M} \frac{E}{1-\sigma^2}\left(\frac{n\pi}{L}\right)^2 = \frac{1}{1+\frac{\Delta m}{M}}\omega_0^2 \quad (8)$$

where $\omega_0$ denotes resonant radian frequency of the unloaded sensor. For small mass loads Eq. (8) reduces to:

$$\Delta f = -\frac{f_0}{2}\frac{\Delta m}{M} \quad (9)$$

where the frequency shift is downward with increasing mass, or $\Delta f = f_n - f_0 < 0$. The resonant frequency of the magneto-elastic sensor-element shifts linearly per mass load, just as it does for surface acoustic wave devices. As found, $\Delta f$ is directly proportional to the gas density and, by virtue of the linear dependence between density and pressure at constant temperature, to gas pressure. Note that under vacuum, mass load becomes vanishingly small.

One can readily appreciate the flexibility of the novel sensing apparatus design of the invention from the additional structures illustrated at in FIGS. 5C, 5D, 5E and 5F. While a single magnetostrictive element provides useful information for one measured parameter (for example, pressure) at a time, an array of magnetostrictive sensing elements, each of slightly different design and respective frequency/time responses, can be used to gather simultaneous real-time measurements of several environmental parameters. Under certain circumstances it is critical to have the capability of tracking additional parameters when monitoring pressure: Such is the case when of compressible fluids where pressure varies with temperature, Eq. (10), below. The rectangular-box shaped receptacle housing 92 has a hermetic separator 87 creating two chambers 88, 89 within housing 92 to contain additional unencumbered magnetostrictive elements (here, labeled 90a, 90b) targeted to monitor temperature, for example. As shown in FIG. 5A, the chamber 88 has a flexible membrane 84 to which a MHM DC bias element 85 is attached by suitable means allowing for deflection of DC bias element 85 in connection with a deflection of membrane 84 in response to a pressure change outside the chamber 88. Likewise, a second MHM DC bias element 95 has been interposed between and in proximity to, magnetostrictive elements 90a, 90b for establishing a DC bias field to operate with elements 90a, 90b to measure temperature of the environment outside chamber 89 (once temperature within chamber 89 and outside thereof has generally come into equilibrium). Chamber 89 can likewise have a flexible membrane 94 made of a material chosen for its thermal conductivity which is preferably sufficient to allow thermal equilibrium within chamber 89 to be reached at a higher rate than if membrane 94 was simply an integral wall of housing 92.

Figure 5C:
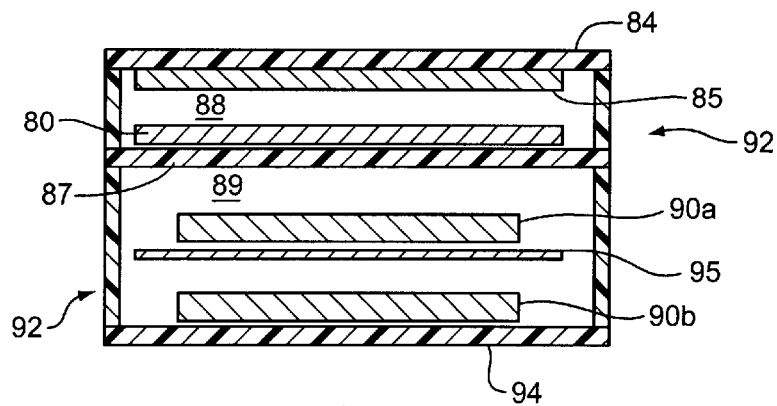
FIGS. 5C and 5D illustrate alternative embodiments having additional elements for sensing another parameter such as temperature of the environment. The alternatives shown in FIGS. 5E and 5F illustrate sensors for which acoustic emissions are detected.
Figure 5D:
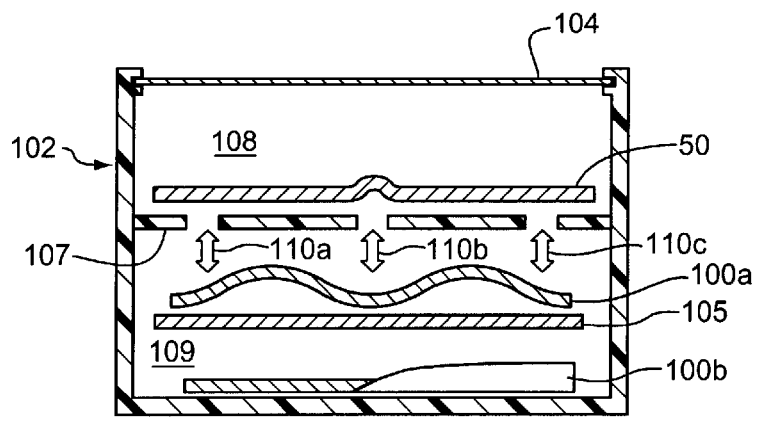

The FIG. 5D sensing package includes housing 102 to which an alloy membrane 104 is hermetically secured. Alloy membrane 104 is preferably made of a MHM having a thickness that allows the membrane to deflect in response to a pressure change outside of chamber 108 causing a change in the relative spacing between MHM membrane 104 and magnetostrictive element 50. This, in turn, causes a change in the magnitude of the DC magnetic field to which the magnetostrictive element 50 is exposed. As the biasing DC magnetic field changes, so does the resonant frequency of the sensor element. And it is this change in resonant frequency, as detected by measuring the emissions from the magnetostrictive sensor element 50, that is of importance for making accurate pressure measurements. As mentioned above, resonant frequency of magnetostrictive element 50 is a function of external pressure on membrane 104. Thus, as stated, once a sensor element (as packaged) has been calibrated and a pre-correlation found between frequency response of the sensor and respective pressure changes, this pre-correlation can be used to find (or monitor) an unknown pressure of an environment using the calibrated sensor package. Separator 107 can have a few larger apertures as shown, or many small perforations, through which fluid (whether in gas or liquid form) can pass along bi-directional arrows 110a, 110b, 110c allowing for equilibrium between chambers 108 and 109.

A second MHM DC bias element 105 has been interposed between and in proximity to, unencumbered magnetostrictive elements 100a, 100b for establishing a DC bias field to operate with elements 100a, 100b to measure temperature of the environment outside housing 102 (once temperature within and outside thereof has generally come into equilibrium). Again, to illustrate the flexibility of the invention, magnetostrictive element 100a has been pre-formed in the shape of a corrugated/wave and element 100b has a bend/twist of 90-degrees (although not limited to these shapes): It is not critical that there be pre-formed localized region(s) in order to obtain precise measurements of frequency response to an applied AC magnetic field, whether in the form of a continuous field (to sweep over a range of successive interrogation frequencies, see graphical representation at 20 in FIG. 1), or applied in the form of a pulse (see graphical representation 30, FIG. 1).

Temperature sensor elements 90a, 90b and 100a, 100b in FIGS. 5C and 5D operate in much the same way to provide respective temperature readings, as the magnetostrictive sensor elements employed to 'sense' pressure. Once activated, each respective MHM element 95, 105 generates a 'local' DC bias field for temperature elements in proximity thereto. Upon the application of an AC magnetic field, these temperature elements respond to emit energy in the form of EM and acoustic energy the response of which is measured using a suitable remote receiver (at 16 in FIG. 1, for example). The material, number of pre-formed regions formed within, shape, and size of each temperature element such as at 90a, 90b, 100a, 100b) are chosen based upon desired frequency response—preferably the frequency response of each temperature element in a pair 90a, 90b or 100a, 100b falls in a range that is distinguishable from the other temperature element in the pair. This is so that, especially in an environment where both pressure and temperature are changing, each respective emission response can be obtained and a cross-correlation between the responses within a pair can be compared to determine an absolute temperature of the environment. Once an absolute temperature has been determined, a corresponding absolute pressure reading may be obtained according to the well known relationship:

$$p=\rho RT, \text{ with } \rho=n/V \quad (10)$$

where p is absolute pressure, $\rho$ is the fluid mass density (especially important for highly-compressible fluids/gasses), V represents volume, R is the gas constant for the particular fluid (e.g., $R_{air}$=287 J/kg ° K), and T represents absolute temperature of that environment.

Figure 5E:
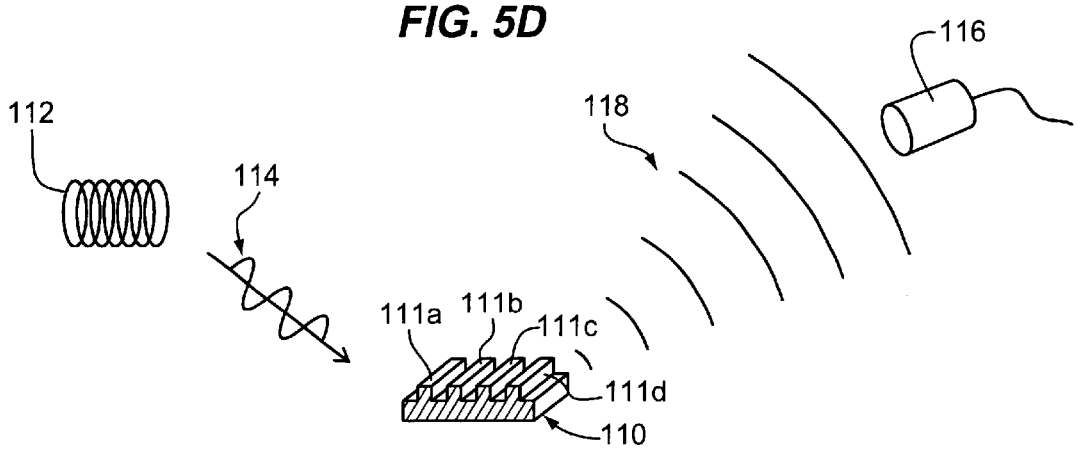
Figure 5F:
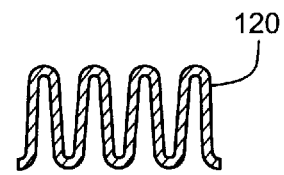

The embodiment shown in FIGS. 5E and 5F, utilize acoustic emissions from a magnetostrictive element 110, 120 to capture the frequency response and time-response thereof with an acoustic receiver 116. The magnetostrictive elements illustrated 110, 120 each have at least one outer surface having convolutions: element 110 has several protuberances 111a–111d in the form of flat-teeth; element 120 has waves; and other suitable convoluted surfaces include saw tooth, crimped, and so on, any of which can aid in the acoustic wave emission of the element (as there is greater surface area on a convoluted element to 'push' fluid molecules of the environment, thus, increasing the intensity of the acoustic waves emitted from the element). For example, a sensor apparatus built for efficient emission of acoustic (elastic) waves 118 according to the invention is paired with a suitable electroacoustic transducer; just as the sensing apparatus designed for detecting electromagnetic emission is paired with suitable EM pick-up coil (see FIG. 1 at 16). As it is known, the nature of acoustic elastic waves is such that they do not propagate through a negative vacuum, or at zero absolute pressure. Electroacoustic transducers that operate over a range of frequencies from 1 kHz to 100 kHz to measure acoustic waves 118 are readily available such as those distributed by APO Acoustics of Belmont, Calif. Although not shown as such, one single receiving unit having several separate receiving coils may be employed to measure EM waves, acoustic waves, or some combination of both EM and acoustic waves emanating from a sensor package having an array of magnetostrictive elements.

As mentioned in connection with the detection of EM emission, the closer the frequency of the interrogating time-varying magnetic field 114 in FIG. 5E is to the fundamental acoustic resonant frequency, $f_A$, of the magnetostrictive sensor element, the greater will be its acoustic emission: A thin ribbon-shaped element more efficiently absorbs energy and radiates at its fundamental acoustic resonant frequency. As the frequency of the interrogating magnetic field moves away from the fundamental resonance frequency, $f_A$, the acoustic emission is reduced (thus, making it more difficult to detect).

In any of the sensing apparatus embodiments, it may be desirable to include an additional MHM element to operate as an ON-OFF switch capable of remote activation. Although the MHM ON-OFF switch element is not shown for simplicity, it can be readily attached/incorporated into upper or lower support members at 64a and 64b, the tube 76, or into a wall or within any of the receptacles labeled 82, 92, 102. In operation, the ON-OFF switch is initially demagnetized with only a minimal stray magnetic field so as not to interfere with sensor operation. To remotely turn the pressure sensor OFF, the MHM is activated by being exposed to a large DC electromagnetic field (such as that emitted by a magnet) to magnetize/activate the MHM so that it supports a large external stray magnetic field. The MHM element may be designed so that the stray field of an activated MHM is either larger than the interrogating time-varying magnetic field (whereby the sensor is 'pushed out' of range such that it effectively no longer responds to the interrogating time-varying field), or the activated MHM element can act to bias the domain structure (i.e., that region within which magnetic moments are uniformly arrayed) of the magnetostrictive element (shown at 10, 50, 60, 70, 80), itself, such that its resonant frequency is no longer within operating range for the receiving unit (16 in FIG. 1). The sensor can be remotely reactivated by demagnetizing the MHM element by exposing it to a time-varying, gradually decreasing magnetic field the initial amplitude of which is greater than the MHM's coercive force.

Sensor magnetostrictive elements (shown by way of example, as ribbon-shaped) such as those labeled throughout the figures at 10, 50, 60, 70, 80, 90*a,* 90*b,* 100*a,* 100*b* 110, 120 may have an overall general size of several centimeters in length and width, or may be built on a smaller scale (on the order of several millimeters in length and width), or may be fabricated as tiny micro-chip type elements using known integrated circuit (IC) fabrication etching, thin-film depositing, and cutting techniques. As the size decreases, the resonant frequency at which the sensor structure will emit waves gets higher (up to the GHz-range). Sensor elements need not have a rectangular or square periphery as shown: The sensor of the invention may be circular, oval, triangular, hexagonal, etc., in shape (peripheral shape may be important in the event a chosen sensor fabrication technique or a chosen magneto-elastic emission dictates). Suitable alloys, known for their magnetostrictive properties include, but are not limited to: iron (Fe), cobalt (Co), yttrium (Y), gadolinium (Gd), terbium (TB), and dysprosium (Dy). Here, by way of example and as already mentioned, analysis and graphical representations have been obtained using ferromagnetic materials which are inherently magnetostrictive. Preferably, materials for the magnetostrictive elements as well as the flexible membranes and DC bias MHM elements, are chosen for their ability to remain generally unchanged and operationally stable over a selected range of environment operating temperatures. Furthermore, components of the sensing apparatus of the invention other than the magnetostrictive elements, DC bias elements, and any ON-OFF switch incorporated therewith elements (namely, receptacle housings, flexible membranes, support members, and such) are preferably made of generally nonconductive-dielectric materials so as not to cause unwanted interference with the expected/calibrated response from sensor elements.

Figure 6:
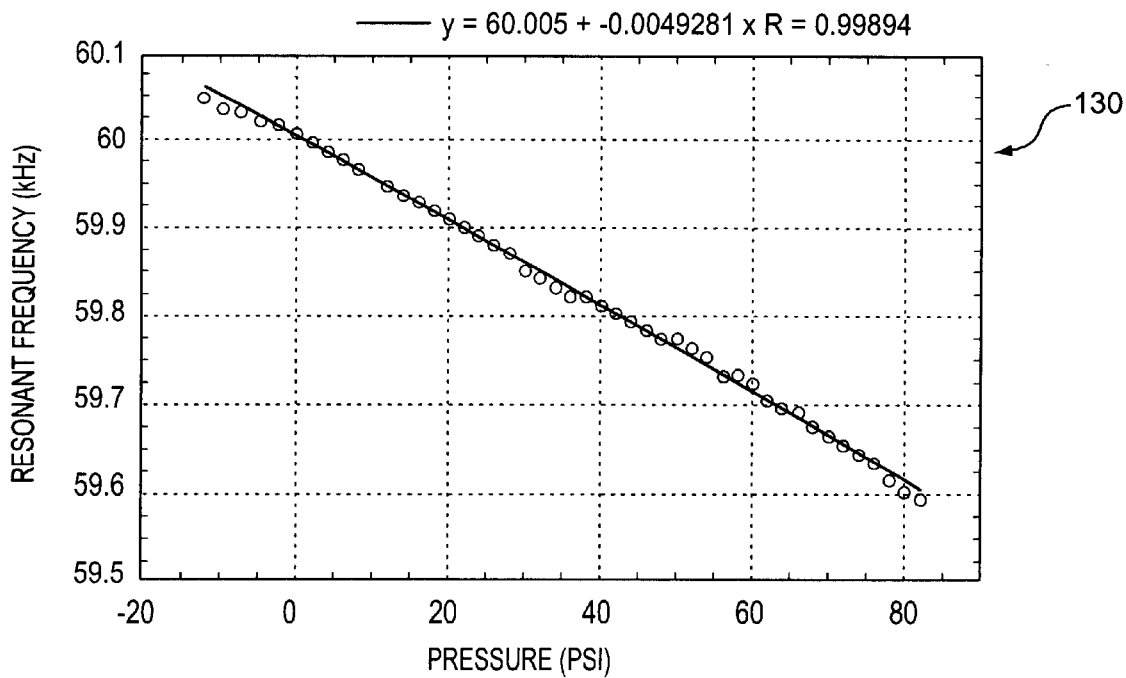
FIG. 6 is a graphical representation of a correlation between a series of resonant frequency values labeled along the vertical Y-axis taken for the FIG. 4D embodiment and a corresponding series of pressure values along the horizontal X-axis, taken for that sensor.
Figure 7:
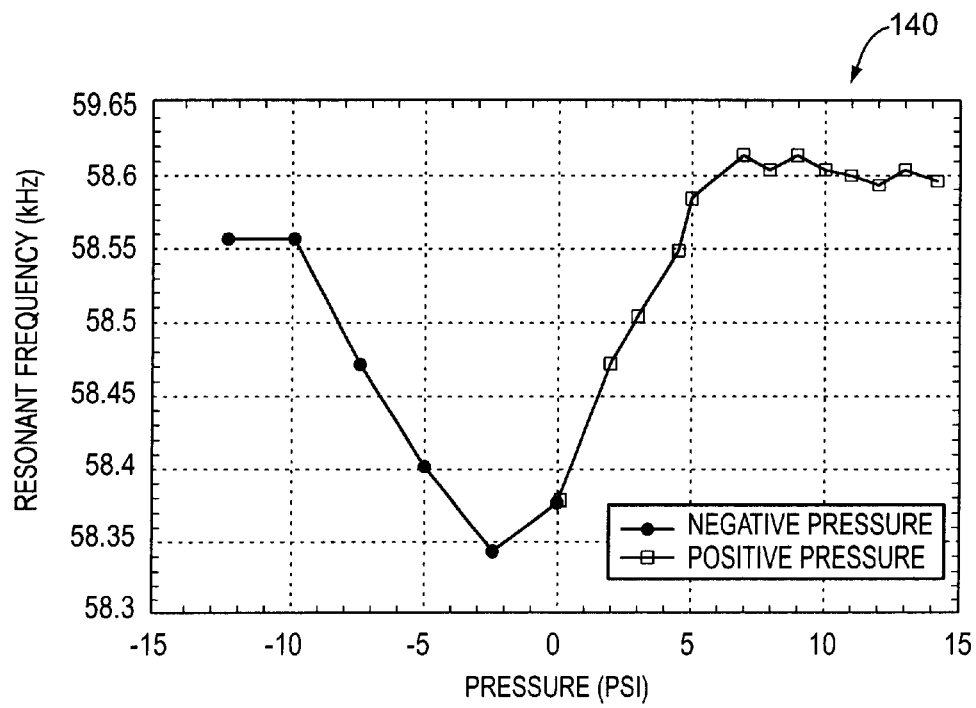
FIG. 7 is a graphical representation of a correlation between a series of resonant frequency values labeled along the vertical Y-axis taken for the FIG. 5A embodiment and a corresponding series of pressure values along the horizontal X-axis, taken for that sensor.
Figure 8:
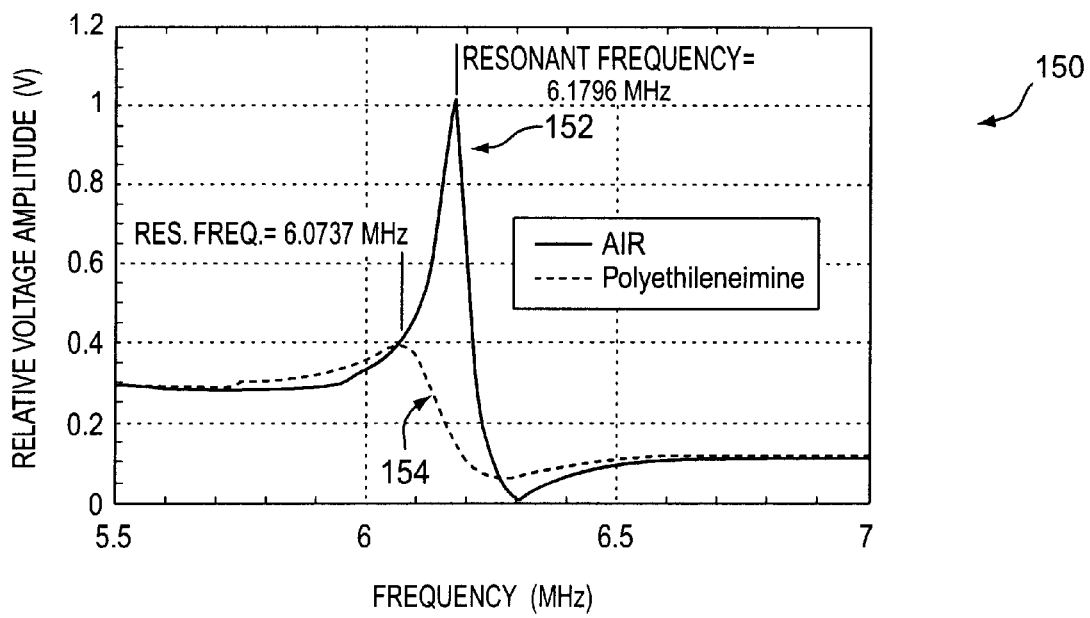
FIG. 8 is a graphical representation illustrating peak-relative voltages at resonant frequency for two different fluid environments using the same sensor element.

More particularly, the graphical representations labeled in FIGS. 6 through 9 were obtaining by using elements made of a thin film amorphous glass commercially distributed under the name METGLAS™ 2826MB. FIG. 6 is a graphical representation 130 of a correlation made between a series of resonant frequency values labeled along the vertical Y-axis taken for the FIG. 4D embodiment and a corresponding series of pressure values along the horizontal X-axis, taken for that sensor. FIG. 7 is a graphical representation 140 of a correlation between a series of resonant frequency values labeled along the vertical Y-axis taken for the FIG. 5A embodiment (the element 80 was approximately 3 mm×20 mm×30 μm) and a corresponding series of pressure values along the horizontal X-axis, taken for that sensor. FIG. 8 is a graphical representation 150 illustrating peak-relative voltages at resonant frequency for two different fluid environments (the graph labeled 152 was made using data taken for an air environment and that labeled 154 was made using data taken for a polyethileneimine environment) using the same METGLAS™ element.

Figure 9:
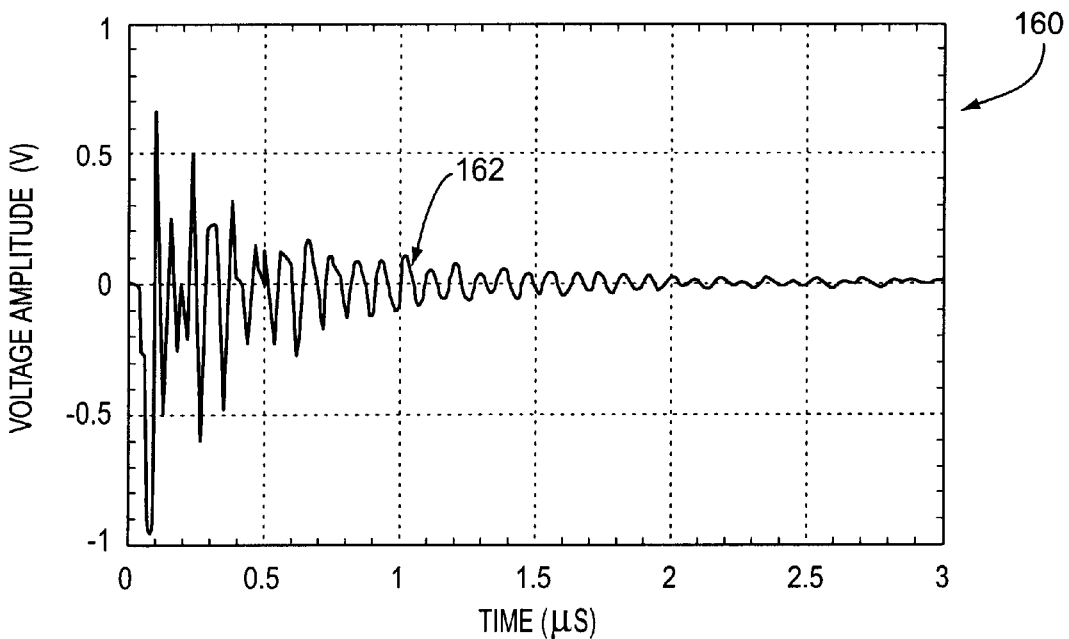
FIG. 9 is a graphical representation of a transitory time-response observed for a senor having received a time-varying magnetic pulse—this response can be readily converted into the frequency domain by operation of a Fourier transform.

FIG. 9 is the transient voltage waveform 162 captured using an oscilloscope connected to a 20-turn pick-up coil surrounding a 250 μm×40 μm×5 μm magneto-elastic sensor element made of METGLAS™ material in response to a 1 μsec magnetic field pulse of approximately 50 mOe amplitude. A fast Fourier transform (FFT) of 162 can readily yield a value for the resonant frequency (graphically shown in FIG. 1 at 32) of the sensor element having produced that time-response. A time-domain measurement technique such as was used to produce the waveform in FIG. 9, needs only about 25 msec to yield a frequency domain resonant frequency value for the element. To resolve the time-domain measurement, the sampling frequency is divided by the number of samples obtained in the FFT data file (for example, to characterize a sensor-element with a resonant frequency of approx. 6 MHz, a 20 MHz sampling rate might be chosen). Although the waveform shown here happens to be a combination of pick-up coil and sensor-element responses, by choosing a pick-up coil with a characteristic resonant frequency falling outside the sensor element operating range one can readily separate the two.

Figure 10:
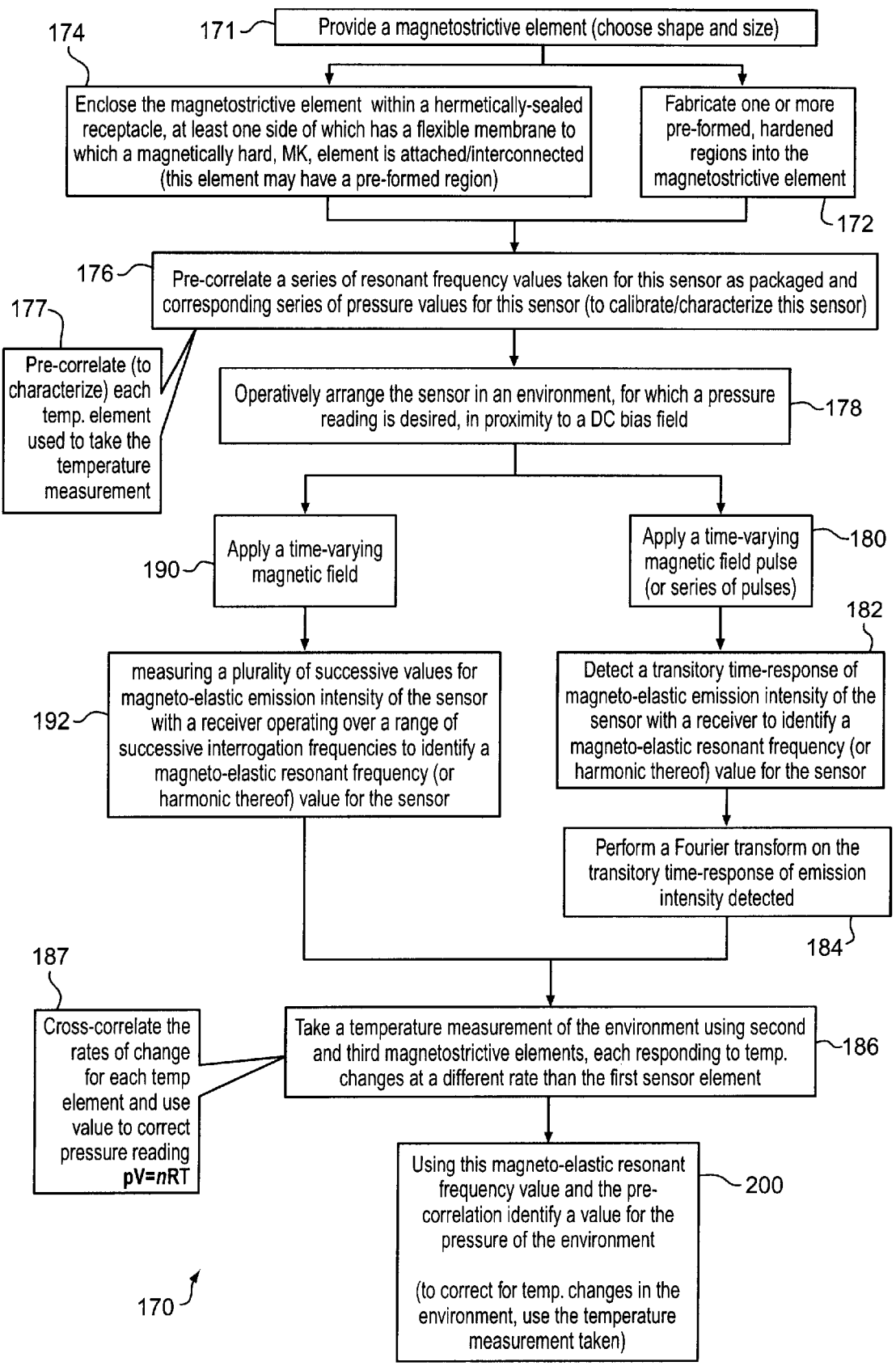
FIG. 10 is a flow diagram detailing preferred and alternate steps of a method of sensing the pressure of an environment using at least one magnetostrictive element as further described herein.

One can better appreciate the operation of preferred and alternative implementations of a novel method 170 of the invention by turning to FIG. 10. Specific novel additional features of the method (plus operation of an overall system) of the invention, as characterized herein, are readily ascertainable from this detailed flow diagram, as labeled. Once a magnetostrictive element has been constructed according to a desired emission response, box 172 explains that a pre-formed, hardened region can be fabricated according to any of the well known techniques. A magnetostrictive element (whether or not it includes such a pre-formed region) can operate from being enclosed within a hermetically-sealed receptacle preferably having a flexible membrane to which a MHM element is attached/interconnected (box 174). Either way, as detailed herein, a pre-correlation of a series of resonant frequency values taken for this sensor element 'as packaged' and a corresponding series of pressure values for this sensor, for later use as a calibration to characterize the sensor can then be performed 176. The aside-note labeled 177 explains that a similar pre-correlation can be done for each temperature element incorporated within the sensor package to likewise characterize each temperature element.

Preferably, the sensor element(s) are operatively arranged within the environment in proximity to a DC bias field (box 178) so that either a time-varying magnetic field pulse, series of pulses (box 180), or of a specified duration (box 190) can be applied. In the case of applying AC magnetic pulse(s), a transitory time-response of the emission intensity is then detected with suitable receiver to identify a magneto-elastic resonant frequency (or harmonic thereof) value for the sensor (box 182); thereafter as explained above, a Fourier transform performed on this time-response will lead to a result in the frequency-domain (box 184)—the result of which can be compared to appropriate pre-correlations of pressure and/or temperature, as the case may be, to obtain a pressure or temperature reading of the environment. In the event an AC magnetic pulse of specified duration (box 190) is applied, a plurality of successive values for magneto-elastic emission intensity of the sensor element with suitable receiver operating over a range of successive interrogation frequencies to identify a resonant frequency (or harmonic thereof) value of the sensor (box 192). In the event temperature of the environment will likely effect pressure readings, for example where the fluid in the environment is compressible, take appropriate temperature measurements (box 186) using additional magnetostrictive elements (having been characterized—see note 177). These temperature responses can then be cross-correlated (see note 187) to correct the pressure reading, as necessary. Finally, the resonant frequency(ies) information obtained is used along with pre-correlation information to identify a pressure (or temperature, as the case may be) of the environment (box 200).

While certain representative embodiments and details have been shown merely for the purpose of illustrating the invention, those skilled in the art will readily appreciate that various modifications may be made without departing from the novel teachings or scope of this invention. Accordingly, all such modifications are intended to be included within the scope of this invention as defined in the following claims. Although the commonly employed preamble phrase "comprising the steps of" may be used herein, or hereafter, in a method claim, the Applicants in no way intends to invoke Section 112 ¶6. Furthermore, in any claim that is filed hereafter, any means-plus-function clauses used, or later found to be present, are intended to cover the structures described herein as performing the recited function and not only structural equivalents but also equivalent structures.

What is claimed is:

1. A pressure sensing apparatus for operative arrangement within an environment, comprising:
    a sensor comprising a hermetically-sealed receptacle, at least one side of which has a flexible membrane to which a magnetically hard element is attached; and enclosed within said receptacle, a magnetostrictive element to vibrate in response to a time-varying magnetic field; and
    a remote receiver to measure a plurality of successive values for magneto-elastic emission intensity of said sensor taken over an operating range of successive interrogation frequencies to identify a resonant frequency value for said sensor, said resonant frequency value for use to identify a value for pressure of the environment.

2. The apparatus of claim 1 wherein said magnetically hard element is adhered to an inner side of said membrane, said membrane is made of a material selected from the group consisting of an impermeable polymer film and thin metal alloy.

3. The apparatus of claim 2 wherein: said receiver is an electromagnetic pick-up coil to measure said emission as a magnetic flux; said resonant frequency value corresponds with a relative maximum of said plurality of successive values for magneto-elastic emission intensity measured; and a pre-correlation made between a series of magneto-elastic resonant frequency values taken for said sensor and a corresponding series of pressure values is used for said identification of said pressure value.

4. The apparatus of claim 1 wherein: said magneto-elastic emission is an acoustic emission, said receiver is an electroacoustic device containing a transducer for operation over a range of frequencies from 1 KHz to 1 GHz; and the magnetostrictive element further comprises an outer surface having convolutions.

5. The apparatus of claim 1 wherein said magnetically hard element comprises a plurality of elongated elements embedded within said membrane so as to produce a DC bias field; said membrane to deflect from an initial position depending upon pressure within the environment; said magnetostrictive element has a pre-formed region.

6. A pressure sensing apparatus for operative arrangement within an environment, comprising:
    a sensor comprising a hermetically-sealed receptacle, at least one side of which has an impermeable flexible membrane to which a magnetically hard element is attached; and enclosed within said receptacle, a magnetostrictive element to vibrate in response to a time-varying magnetic field pulse; and
    a remote receiver to detect a transitory time-response of magneto-elastic emission intensity of said sensor due to said pulse and identify a magnet-elastic resonant frequency value thereof, said resonant frequency value for use to identify a value for pressure of the environment.

7. The apparatus of claim 6 wherein said detection is performed after a threshold amplitude value for said transitory time-response of magneto-elastic emission intensity is observed; said identification of said magneto-elastic resonant frequency value comprises performing a Fourier transform on said transitory time-response of magneto-elastic emission intensity detected.

8. The apparatus of claim 6 wherein said receiver is an electromagnetic pick-up coil; said pressure sensor magnetostrictive element is elongated in shape and is made of an alloy of an element selected from the group consisting of iron, cobalt, nickel, yttrium, gadolinium, terbium, and dysprosium; and said pressure sensor is incorporated within an array including a second and third magnetostrictive element, each having a respective second and third characteristic resonant frequency that changes at a respective second and third rate in response to a change in temperature of the environment.

9. The apparatus of claim 8 wherein said pressure sensor magnetostrictive element is separated by a hermetic-barrier from said second and third magnetostrictive elements, and temperature measurements taken of the environment using said second and third elements and a pre-correlation made between a series of magneto-elastic resonant frequency values taken for said sensor magnetostrictive element and a corresponding series of pressure values are used for said identification of said value for pressure of the environment.

10. The apparatus of claim 6 wherein: said magneto-elastic emission is an acoustic emission, said receiver is an electroacoustic device containing a transducer for operation over a range of frequencies from 1 KHz to 1 GHz; the magnetostrictive element further comprises an outer surface having convolutions; and a pre-correlation made between a series of magneto-elastic resonant frequency values taken for said sensor and a corresponding series of pressure values is used for said identification of said value for pressure of the environment.

11. A pressure sensing apparatus for operative arrangement within an environment, comprising:
    a sensor comprising an elongated magnetostrictive element having a pre-formed region, said element to vibrate in response to a time-varying magnetic field;
    in proximity to said sensor, a DC bias field; and
    a remote receiver to measure a plurality of successive values for magneto-elastic emission intensity of said sensor taken over an operating range of successive interrogation frequencies to identify a resonant frequency value for said sensor, said resonant frequency value for use to identify a value for pressure of the environment.

12. The apparatus of claim 11 wherein: said resonant frequency value corresponds with a relative maximum of said plurality of successive values for magneto-elastic emission intensity measured; a temperature measurement taken of the environment and a pre-correlation made between a series of magneto-elastic resonant frequency values taken for said sensor and a corresponding series of pressure values are used for said identification of said value for pressure of the environment.

13. The apparatus of claim 11 wherein: said magneto-elastic emission is an electromagnetic emission; said receiver is an electromagnetic pick-up coil to measure said emission as a magnetic flux; said DC bias field is generated by a magnetized magnetically hard element; said elongated magnetostrictive element is a micro-ribbon and has a biocompatible coating; and said pre-formed region comprises a pre-stressed area formed into a shape selected from the group consisting of an embossed-dimple, a fold, a crease, and a twist-bend.

14. The apparatus of claim 11 wherein: said magneto-elastic emission is an acoustic emission, said receiver is an electroacoustic device containing a transducer for operation over a range of frequencies from 1 KHz to 1 GHz; and the magnetostrictive element further comprises an outer surface having convolutions selected from the group of shapes consisting of teeth, waves, and protrusions.

15. A pressure sensing apparatus for operative arrangement within an environment, comprising:
    a sensor comprising an elongated first magnetostrictive element having a pre-formed region, said element to vibrate in response to a time-varying magnetic field pulse;
    in proximity to said sensor, a DC bias field; and
    a remote receiver to detect a transitory time-response of magneto-elastic emission intensity of said sensor due to said pulse and identify a magneto-elastic resonant frequency value therefore; a pre-correlation made between a series of magneto-elastic resonant frequency values taken for said first magnetostrictive element and a corresponding series of pressure values for use to identify a value for pressure of the environment.

16. The of claim 15 wherein said detection is performed after a threshold amplitude value for said transitory time-response of magneto-elastic emission intensity is observed; said identification of said magneto-elastic resonant frequency value comprises performing a Fourier transform on said transitory time-response of magneto-elastic emission intensity detected.

17. The apparatus of claim 15 wherein: said first element is shaped as selected from the group consisting of ribbon-shaped, planar-square, and plate-shaped; said first element is made of an alloy of an element selected from the group consisting of iron, cobalt, nickel, yttrium, gadolinium, terbium, and dysprosium, said pre-formed region comprising a twist-bend in said element; said DC bias field is generated by an active coil element; and a temperature measurement taken of the environment and said pre-correlation made between a series of magneto-elastic resonant frequency values taken for said sensor and a corresponding series of pressure values are used for said identification of said value for pressure of the environment.

18. The apparatus of claim 15 wherein said identification is made using a computerized processor, said magneto-elastic resonant frequency is a harmonic; said first element is a micro-element made of an alloy of an element selected from the group consisting of iron, cobalt, nickel, yttrium, gadolinium, terbium, and dysprosium, and further comprising an ON-OFF switch comprising a magnetically hard element positioned nearby said first element such that, once activated to support an external stray magnetic field, said switch can reversibly turn said sensor off.

19. The apparatus of claim 15 further comprising an unsealed receptacle having an aperture, at least one side of which has an impermeable flexible membrane to which a magnetically hard element for generating said DC bias field is attached; and wherein said sensor is positioned within said receptacle along with a second and third magnetostrictive element, each having a respective second and third characteristic resonant frequency that changes at a rate different from that of said first element in response to a change in temperature of the environment.

20. The apparatus of claim 19 wherein said pressure sensor magnetostrictive element is separated by a hermetic-barrier from said second and third magnetostrictive elements, and temperature measurements taken of the environment using said second and third elements and said pre-correlation made between a series of magneto-elastic resonant frequency values taken for said sensor magnetostrictive element and a corresponding series of pressure values are used for said identification of said value for pressure of the environment.

21. A method of sensing pressure of an environment using a sensor with a magnetostrictive element, comprising the steps of:
    providing the magnetostrictive element with a pre-formed region and operatively arranging the element in the environment in proximity to a DC bias field;
    applying a time-varying magnetic field;
    measuring a plurality of successive values for magneto-elastic emission intensity of the sensor with a remote receiver operating over a range of successive interrogation frequencies to identify a magneto-elastic resonant frequency value for the sensor; and
    using said magneto-elastic resonant frequency value, identify a value for the pressure thereof.

22. The method of claim 21 further comprising the steps of initially pre-correlating a series of resonant frequency values taken for the sensor with said pre-formed region and a corresponding series of pressure values for the sensor, and taking a temperature measurement of the environment; and wherein said identification of said value for the pressure further comprises the step of using said pre-correlation and said temperature measurement taken.

23. A method of sensing pressure of an environment using a sensor with a magnetostrictive element, comprising the steps of:
    enclosing the magnetostrictive element within a hermetically-sealed receptacle, at least one side of which has a flexible membrane to which a magnetically hard element is attached, and operatively arranging the element in the environment;
    applying a time-varying magnetic field;
    measuring a plurality of successive values for magneto-elastic emission intensity of the sensor with a remote receiver operating over a range of successive interrogation frequencies to identify a magneto-elastic resonant frequency value for the sensor; and
    using said magneto-elastic resonant frequency value, identify a value for the pressure of the environment.

24. The method of claim 23 further comprising the steps of initially pre-correlating a series of resonant frequency values taken for the sensor with said pre-formed region and a corresponding series of pressure values for the sensor, and taking a temperature measurement of the environment; and wherein said identification of said value for the pressure further comprises the step of using said pre-correlation and said temperature measurement taken.

25. A method of sensing pressure of an environment using a sensor with a magnetostrictive element, comprising the steps of:

providing the magnetostrictive element with a pre-formed region and operatively arranging the element in the environment in proximity to a DC bias field;

applying a time-varying magnetic field pulse;

detecting a transitory time-response of magneto-elastic emission intensity of the sensor with a remote receiver to identify a magneto-elastic resonant frequency value for the sensor; and using said magneto-elastic resonant frequency value, identify a value for the pressure thereof.

26. The apparatus of claim 25 wherein said step of detecting is performed after a threshold amplitude value for said transitory time-response of magneto-elastic emission intensity is observed; and said identification of said magneto-elastic resonant frequency value comprises the step of performing a Fourier transform on said transitory time-response of magneto-elastic emission intensity detected.

27. A method of sensing pressure of an environment using a sensor with a magnetostrictive element, comprising the steps of:

enclosing the magnetostrictive element within a hermetically-sealed receptacle, at least one side of which has a flexible membrane to which a magnetically hard element is attached, and operatively arranging the element in the environment;

applying a time-varying magnetic field pulse;

detecting a transitory time-response of magneto-elastic emission intensity of the sensor with a remote receiver to identify a magneto-elastic resonant frequency value for the sensor; and using said magneto-elastic resonant frequency value, identify a value for the pressure thereof.

28. The method of claim 27 wherein said step of detecting is performed after a threshold amplitude value for said transitory time-response of magneto-elastic emission intensity is observed; and said identification of said magneto-elastic resonant frequency value comprises the step of performing a Fourier transform on said transitory time-response of magneto-elastic emission intensity detected.

* * * * *